United States Patent
Bern et al.

(10) Patent No.: US 6,968,085 B2
(45) Date of Patent: Nov. 22, 2005

(54) DOCUMENT MATCHING AND ANNOTATION LIFTING

(75) Inventors: Marshall W. Bern, San Carlos, CA (US); David Goldberg, Palo Alto, CA (US); Ming Ye, Seattle, WA (US)

(73) Assignee: Xerox Corporation, Stamford, CT (US)

( * ) Notice: Subject to any disclaimer, the term of this patent is extended or adjusted under 35 U.S.C. 154(b) by 603 days.

(21) Appl. No.: 09/950,205

(22) Filed: Sep. 10, 2001

(65) Prior Publication Data

US 2003/0048949 A1 Mar. 13, 2003

(51) Int. Cl.⁷ .............................................. G06K 9/68
(52) U.S. Cl. ........................................................ 382/218
(58) Field of Search ................................. 382/112, 135, 382/137, 159, 173, 181, 195, 199, 201, 202, 205, 209, 213, 218, 288, 305; 340/5.86; 399/366; 707/6, 9, 10; 715/512

(56) References Cited

U.S. PATENT DOCUMENTS

| | | | | |
|---|---|---|---|---|
| 5,067,162 A | * | 11/1991 | Driscoll et al. | ............. 382/126 |
| 5,696,838 A | * | 12/1997 | Chiu et al. | ................... 382/159 |
| 6,122,401 A | * | 9/2000 | Nagao | ......................... 382/216 |
| 6,222,883 B1 | * | 4/2001 | Murdock et al. | ....... 375/240.16 |
| 6,272,245 B1 | * | 8/2001 | Lin | .............................. 382/195 |
| 6,320,977 B1 | * | 11/2001 | Tokura | ........................ 382/151 |
| 6,343,204 B1 | * | 1/2002 | Yang | ........................... 399/366 |
| 6,545,706 B1 | * | 4/2003 | Edwards et al. | ............ 348/169 |

OTHER PUBLICATIONS

J. Mao and K. Mohiuddin, Form Dropout Using Distance Transformation, *Proc. Int. Conf. on Image Processing*, vol. 3, 1995, pp. 328–331.

* cited by examiner

*Primary Examiner*—Daniel Miriam
(74) *Attorney, Agent, or Firm*—Daniel B. Curtis

(57) ABSTRACT

A method for matching an original document image with a copy image is disclosed. The original document image is defined as an ensemble of blocks, each of the blocks having neighboring blocks. A mask is formed for each of the blocks by dilating foreground pixels included in the block. A best match is searched in the copy image, for each of the blocks, using a search window, by correlating pixels in the mask with pixels in a corresponding portion in the copy image. Each of the best matches has a matching score. Each of the blocks is indicated as "unmatched" when the corresponding matching score is less than a matching threshold. A displacement vector is computed for each of the matched blocks.

27 Claims, 14 Drawing Sheets

FIG. 5
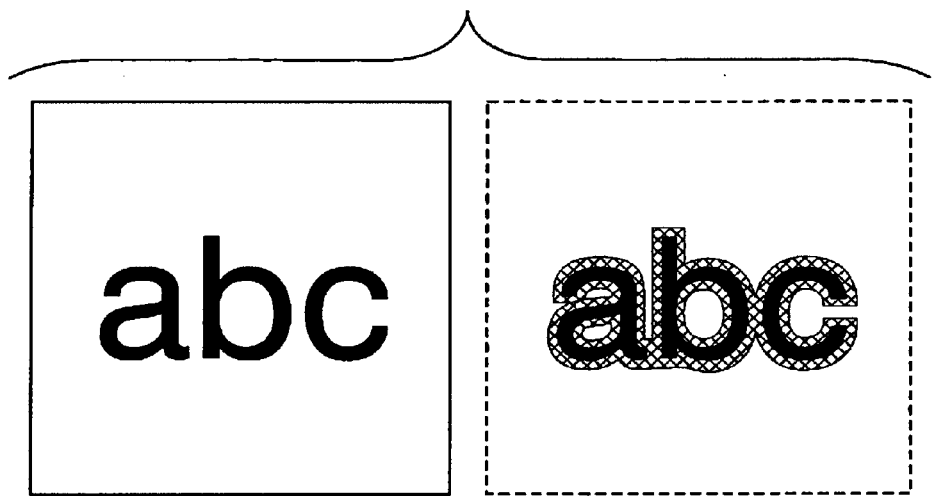
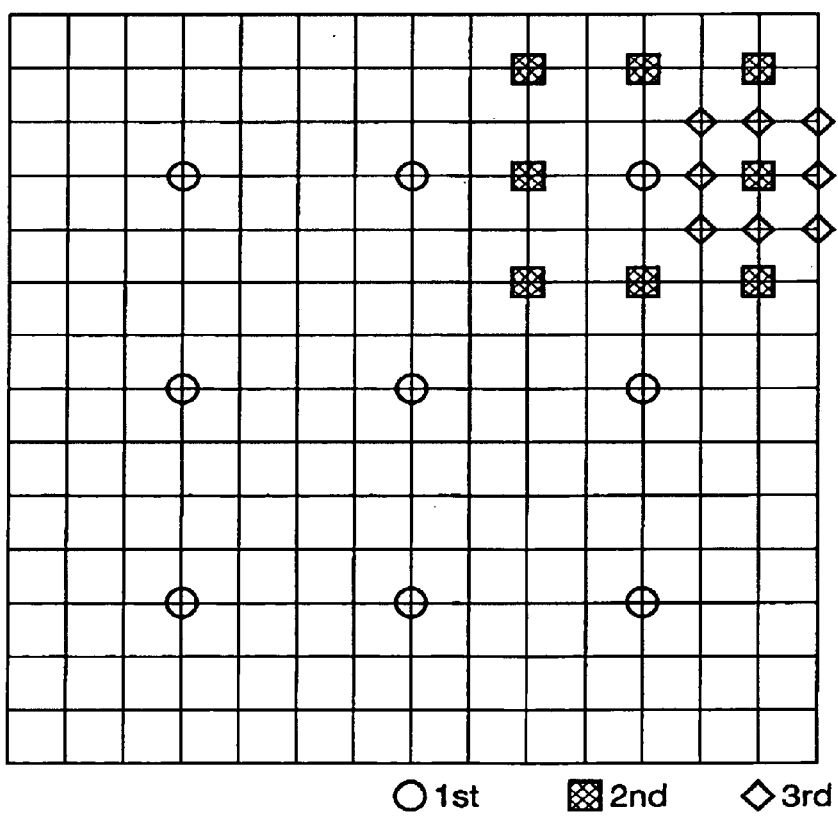
FIG. 6

DOCUMENT MATCHING AND ANNOTATION LIFTING

BACKGROUND OF THE INVENTION

1. Field of the Invention

The present invention relates generally to methods and systems for image processing, and particularly to methods and systems for matching documents and lifting annotations present in only one of the two matched documents.

2. Description of Related Art

Traditionally many information gathering tasks have been carried out using paper documents. Examples include opinion surveys, tax returns, check processing, and revising and editing text. An important step in many such tasks is annotation lifting, that is, the problem of extracting content added to an original document. A special case of annotation lifting is called form dropout, in which the added content is assumed to appear only in certain predefined locations. In order to extract annotations from an annotated document, the annotated document has to be matched with an image of the original document of which the annotated document is a copy.

Matching two images of a same document is not a simple task since the two images could differ significantly due to faxing, scanner distortions, or degradation through multi-generation copying. Preprinted data of an original document image may appear distorted when compared to preprinted data of an annotated copy of the same original document, and the distortion may be different for different parts of the image.

There is a need for an efficient method for registering two such images and for separating out annotations. There is also a need for an efficient algorithm for detecting and repairing broken strokes in the annotations, which occur when the annotations cross or touch preprinted data.

In addition to annotation lifting, such method for document matching also finds application in duplicate removal and in document image authentication in which the task is to confirm that a document has not changed since authorship.

SUMMARY OF THE INVENTION

A method for matching an original document image with a copy image is disclosed. The original document image is defined as an ensemble of blocks, each of the blocks having neighboring blocks. A mask is formed for each of the blocks by dilating foreground pixels included in the block. A best match is searched in the copy image, for each of the blocks, using a search window, by correlating pixels in the mask with pixels in a corresponding portion in the copy image. Each of the best matches has a matching score. Each of the blocks is indicated as "unmatched" when the corresponding matching score is less than a matching threshold. A displacement vector is computed for each of the matched blocks.

BRIEF DESCRIPTION OF THE DRAWINGS

The features and advantages of the present invention will become apparent from the following detailed description of the present invention in which:

FIG. 5 illustrates an example of a mask obtained by dilation of the black pixels in a block of the original document.

FIG. 6 illustrates a hierarchical search covering a 15×15 search window.

DETAILED DESCRIPTION OF THE INVENTION

Figure 1:
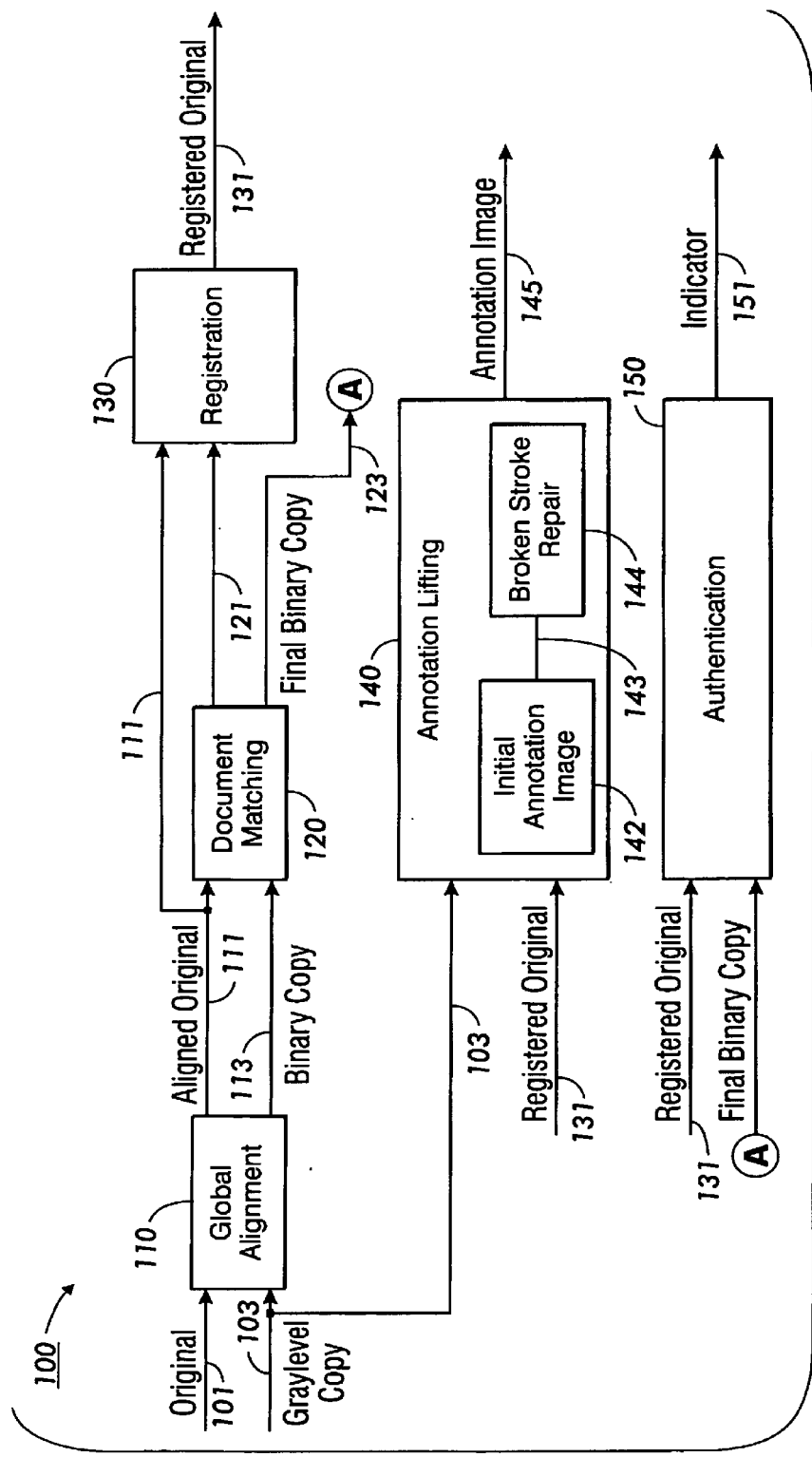
FIG. 1 is a block diagram of one embodiment of the system of the present invention.

The present invention discloses a method and a system for matching an original document image with a copy image. The original document image is defined as an ensemble of blocks, each of the blocks having neighboring blocks. A mask is formed for each of the blocks by dilating foreground pixels included in the block. A best match is searched in the copy image, for each of the blocks, using a search window, by correlating pixels in the mask with pixels in a corresponding portion in the copy image. Each of the best matches has a matching score. Each of the blocks is indicated as "unmatched" when the corresponding matching score is less than a matching threshold. A displacement vector is computed for each of the matched blocks.

The present invention also discloses a method for annotation lifting.

It will be obvious to one skilled in the art that the present invention can be used to match an original document image that is in either gray-level or binary form with a copy image that is in either gray-level or binary form.

Original document images sent over the Internet are likely in binary form to save memory and bandwidth. Scanned images stored by low-cost scanners are also usually in binary form. Therefore, the case where an original document image in binary form (to save memory and bandwidth) needs to be matched with a gray-level copy image will likely find more applications in the business environment. One example of business applications is the validation of drug prescription forms.

The present invention will be described in detail as applied to the case where the original document image is in binary form and the copy image is in gray-level form. However, this is not to be construed as a limitation of the present invention.

The method of the present invention does not depend on assumptions of document structure or annotation location. It can handle general document images containing text, drawings, and halftone images. Annotations can be arbitrarily placed, even touching or overlapping preprinted data (i.e., original content of the original document image).

The following terms are used throughout the description of the present invention, and are defined here for clarity.

The term "connectivity" denotes the criterion that describes how pixels in an image form a connected group. For example, a connected component is "8-connected" if diagonally adjacent pixels are considered to be touching.

The term "foreground pixels" denotes pixels that form the text or image. In a binary image, if the writing is black on a white background, then the foreground pixels are black. If the writing is white on a black background, then the foreground pixels are white.

The term "structuring element" denotes the matrix that is used to define a neighborhood shape and size for a morphological operation such as dilation.

The term "dilation" denotes the operation where the value of the output pixel is the maximum value of all the pixels in the input pixel's neighborhood. In a binary image, if any of the pixels is set to the value 1, the output pixel is set to 1.

In the following description of one embodiment of the present invention, the global alignment and registration processes are applied to the original document image. It is obvious that they can be applied to the copy image instead.

FIG. 1 is a block diagram of one embodiment of the system of the present invention. System 100 comprises a global alignment module 110, a document matching module 120, a registration module 130. Optionally, depending on an application of the present invention, system 100 can also include an annotation lifting module 140 or an authentication module 150.

The global alignment module 110 receives as inputs an original document image 101 and a gray-level copy 103, and outputs an aligned original document image 111 and a binary copy 113. The original document image is assumed to be in binary form, to save memory and bandwidth. If it is in a gray-level form, it can be easily thresholded to produce a binary scan.

The document matching module 120 matches the aligned original document image 111 with the binary copy 113 and produces a map of local displacement vectors 121. It also produces a final binary copy 123.

The registration module 130 applies the map of local displacement vectors 121 on the aligned original document image 111 to produce a registered original document image 131.

In an application where extraction of annotations present only on the gray-level copy is required, system 100 also includes the annotation lifting module 140. The annotation lifting module 140 receives as inputs the registered original document image 131 and the gray-level copy 103 and outputs an annotation image 145. The annotation lifting module 140 includes an initial annotation image module 142 and a broken stroke repair module 144. The initial annotation image module 142 produces an initial annotation image 143. The broken stroke repair module 144 repairs broken strokes, if any, in the initial annotation image 143 and outputs the annotation image 145.

In an application where authentication of the gray-level copy is required, system 100 also includes the authentication module 150. The authentication module 150 receives as inputs the registered original document image 131 and the final binary copy 123 and outputs an indicator 151 which indicates whether the gray-level copy is authenticated.

Figure 2:
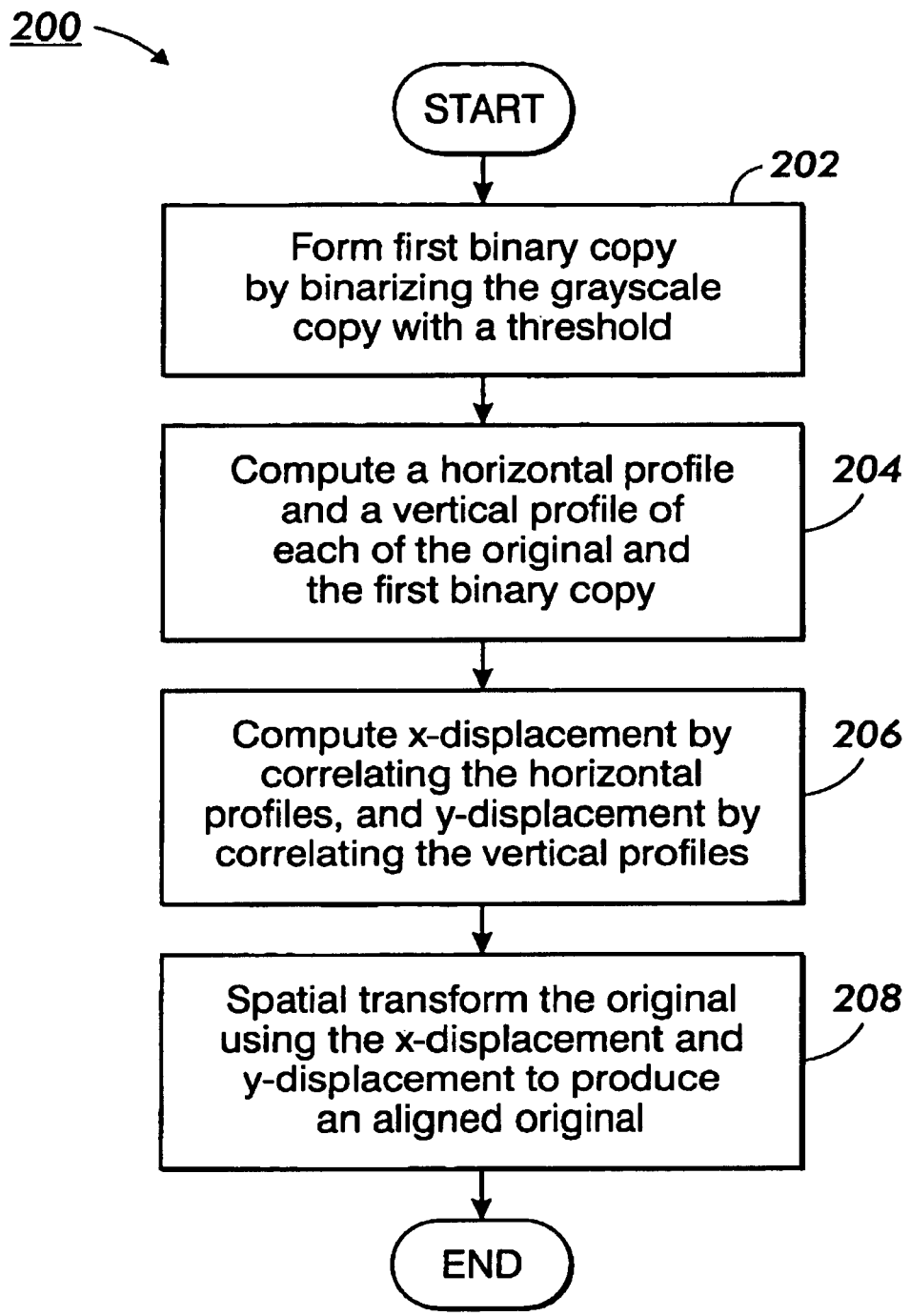
FIG. 2 is a flowchart illustrating the process of the global alignment module 110 (FIG. 1) as implemented in one embodiment of the present invention.

FIG. 2 is a flowchart illustrating the process of the global alignment module 110 (FIG. 1) as implemented in one embodiment of the present invention. Process 200 forms a first binary copy by binarizing the gray-level copy with a threshold (block 202). Process 200 computes a horizontal profile and a vertical profile for the original document image and for the first binary copy (block 204). The horizontal profile is computed by summing the columns of black pixels. The vertical profile is computed by summing the rows of black pixels. Then, process 200 computes the displacement in the x-coordinate by correlating the horizontal profile of the original document image with the horizontal profile of the first binary copy, and the displacement in the y-coordinate by correlating the vertical profile of the original document image with the vertical profile of the first binary copy (block 206). The displacements in the x-coordinate and y-coordinate, are computed from the maxima in the correlations of horizontal and vertical profiles. Finally, process 200 spatial transforms the original document image using the displacement in the x-coordinate and the displacement in the y-coordinate to produce an aligned original document image (block 208).

After the global alignment, the aligned original document image is divided into overlapping blocks for local matching. In one embodiment, each block has a size of 200×200 pixels with an overlap of 10 pixels with each neighboring block. The overlap prevents gaps between blocks in the aligned original. The result of the local matching is a distortion map in which each block is associated with a displacement vector and a matching score. The optimal distortion map is defined to be the one that maximizes block matching scores and minimizes variance of neighboring displacement vectors. This map is approximated through iterative relaxation, with initial matches given by a hierarchical search scheme. The hierarchical search scheme will be described later.

Figure 3:
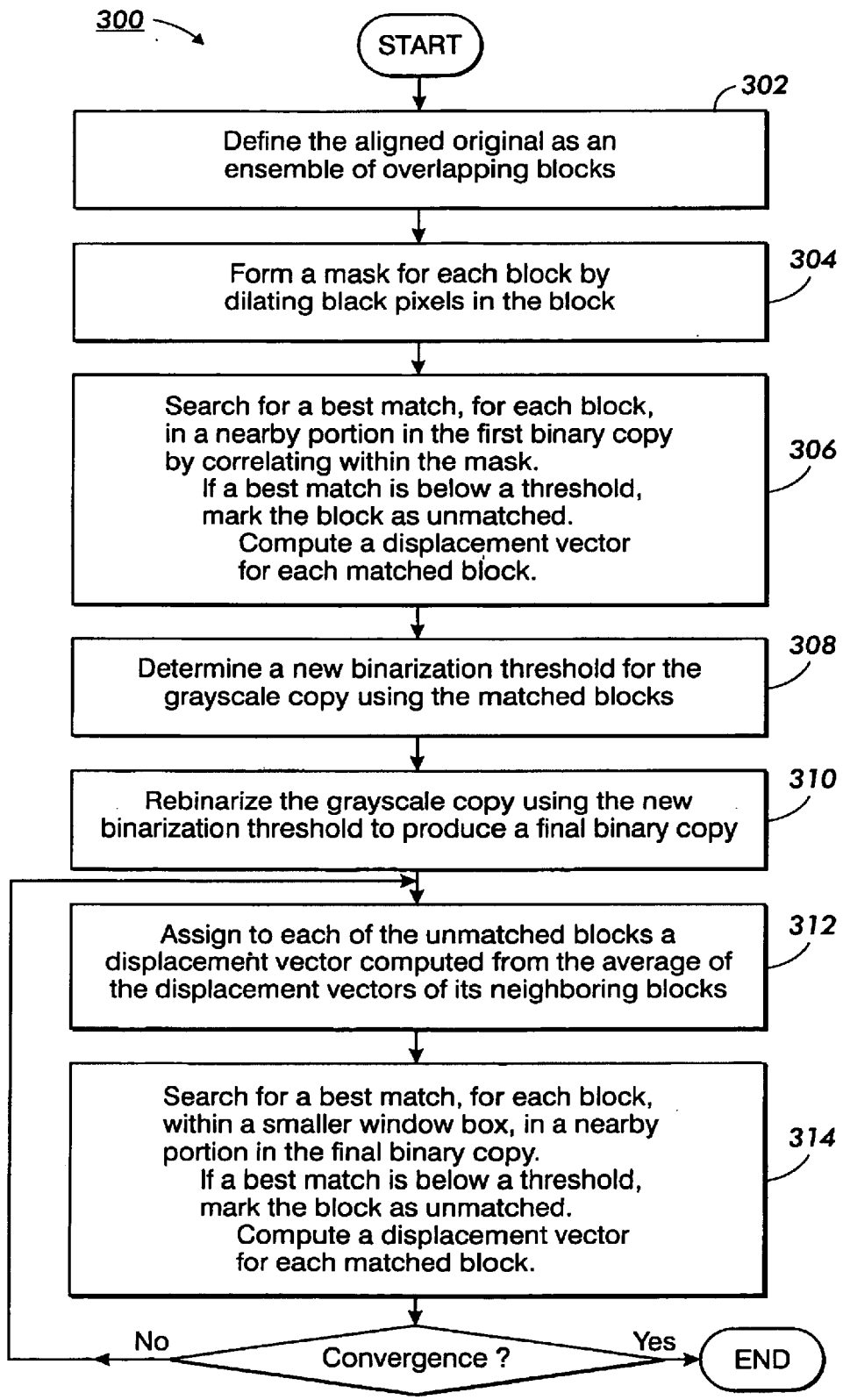
FIG. 3 is a flowchart illustrating the process of the document matching module 120 (FIG. 1) as implemented in one embodiment of the present invention.

FIG. 3 is a flowchart illustrating the process of the document matching module 120 (FIG. 1) as implemented in one embodiment of the present invention.

Process 300 defines the aligned original document image as an ensemble of overlapping image blocks (block 302), then forms a mask for each of the image blocks by dilating the black pixels in the image block (block 304). For each image block, process 300 searches for a best match in the first binary copy, using a first search window, by correlating pixels in the mask with pixels in a corresponding portion in the first binary copy. Each of the best matches is associated with a matching score. Each image block is marked as "unmatched" when the corresponding matching score is less than a matching threshold. Process 300 computes a displacement vector for each of the matched blocks (block 306). If all the image blocks are matched, process 300 terminates.

Otherwise, based on the matched blocks, process 300 computes a second binarization threshold for the gray-level copy (block 308). Using the second binarization threshold, process 300 binarizes the gray-level copy to produce a second binary copy (block 310). Process 300 assigns to each of the unmatched blocks a displacement vector computed from an average of respective displacement vectors of the neighboring blocks of the unmatched block (block 312). In one embodiment, eight neighboring blocks are used in this computation. Process 300 searches for a new best match in the second binary copy, for each of the blocks, using a second search window, by correlating pixels in the mask with pixels in a corresponding portion in the second binary copy (block 314). The second search window can be much smaller than the first search window. Each of the new best marches is associated with a new matching scale. Each of tile image blocks is marked as "unmatched" when the corresponding new matching score is less than a matching threshold. A new displacement vector is computed for each of the new matched blocks. If convergence is reached, that is, if all the image blocks are matched, process 300 terminates. Otherwise, process 300 repeats block 312 and block 314 until convergence is reached.

In block 306 and 314 of FIG. 3, process 300 uses a hierarchical search to find the best match of an image block.

Figure 4:
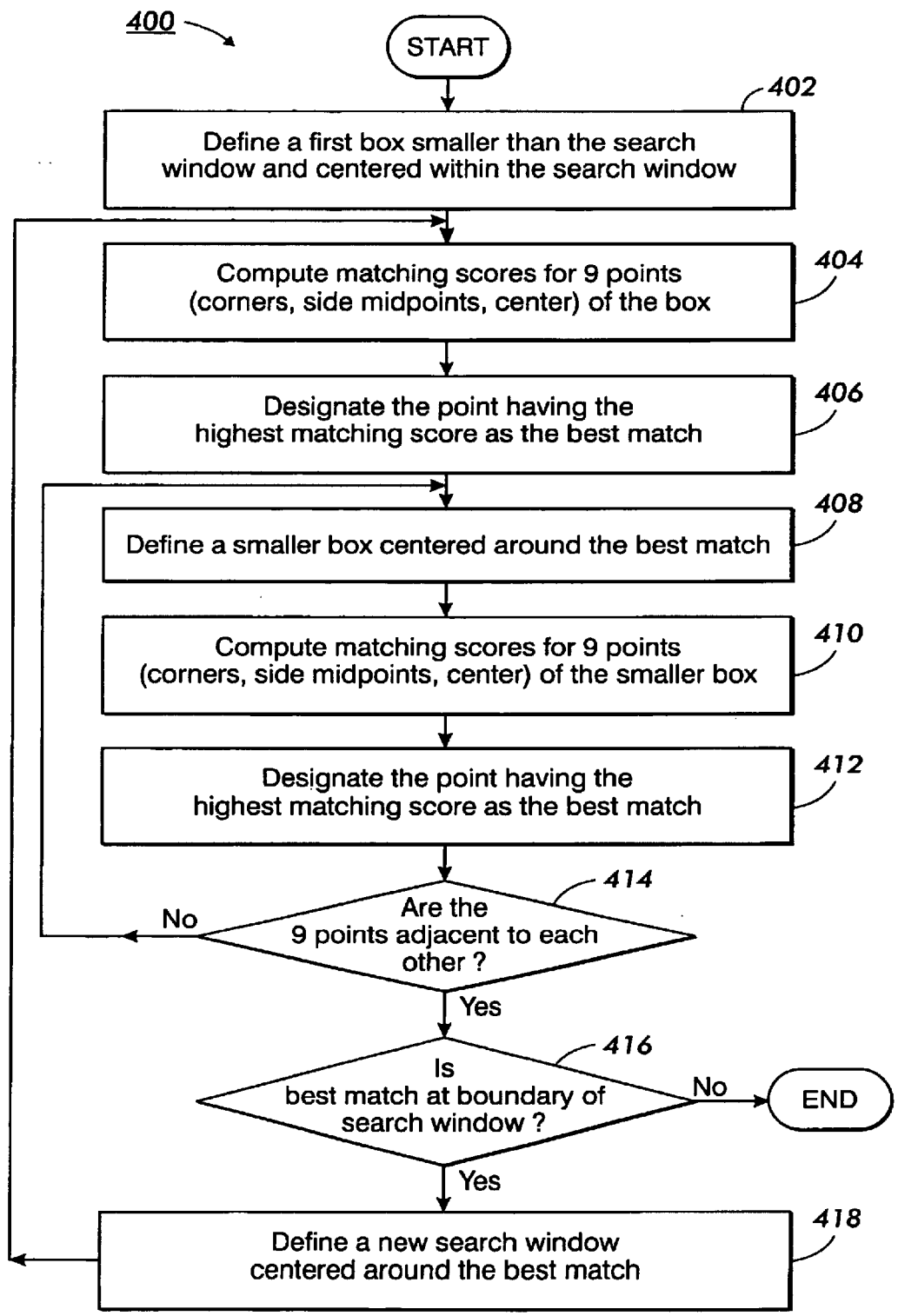
FIG. 4 is a flowchart illustrating an exemplary hierarchical search process as implemented in one embodiment.

FIG. 4 is a flowchart illustrating an exemplary hierarchical search process 400.

Process 400 defines a first box smaller than the search window and centered within the search window (block 402). Process 400 computes matching scores for matches located at points located within the first box. In one embodiment, it computes matching scores for 9 points which are the corners, side midpoints and center of the first box (block 404). Process 400 designates the point having the highest matching score as the best match (block 406), defines a box smaller than the previous box and centered around the best match (block 408). Process 400 computes matching scores for matches located at points located at the corners, side midpoints and center of the smaller box (block 410). Process 400 designates the point having the highest matching score as the best match (block 412). If the 9 points of the smaller box are not adjacent to each other, process 400 repeats blocks 408, 410 and 412. If the 9 points of the smaller box are adjacent to each other, then process 400 checks whether the best match is at the boundary of the search window (block 416). If it is not, process 400 terminates. Otherwise, process 400 defines a new search window centered around the best match (block 418) and repeats blocks 404 through 416.

To minimize the interference of possible annotations, the matching is examined only within a mask obtained by dilating the black pixels in the original. FIG. 5 illustrates an example of a mask obtained by dilation of the black pixels in a block of the original document image.

The matching score for a given displacement is defined as the number of overlapping black pixels divided by the average number of black pixels in the mask and the region of the binary copy corresponding to the mask. This score has range [0,1], and allows comparison among different blocks on the same page.

If the block has more than 75% black pixels, it is assumed to be primarily white writing on a black background. The colors are then flipped before the mask is created and before the matching is started. Nearly pure black or white blocks are considered "empty" and their matches are initially disregarded. The displacement vectors for these "empty" blocks will be computed from neighboring matches.

In one embodiment, the distortion map is initialized by independently searching for each non-empty block's best match within a 29×29 window. Rather than using a brute-force implementation, which would compute all 841=(29× 29) matching scores, a hierarchical search scheme is used.

The search scheme first computes the matches for the corners, center, and side midpoints of a box, then matches for corners and side midpoints of a smaller box, centered at the highest-scoring point from the first level, and so forth. A 15×15 search window is covered by using box sizes of 9×9, 5×5, and 3×3. If the best match turns out to be on the boundary, another such 15×15 search centered on the best match is performed, thus covering a 29×29 window overall. For the 29×29 window case, this hierarchical search scheme reduces the number of matching score computations to a worst case of 49. This represents a substantial reduction in computations, compared to the 841 computations that would be required by the brute-force implementation. In general, if the brute-force scheme requires N computations, then this hierarchical scheme requires only log(N) computations.

FIG. 6 illustrates a hierarchical search covering a 15×15 search window.

Adaptive thresholding is used in the hierarchical search scheme. A match is accepted for a given block if its matching score exceeds a certain value. These good matches (even a very few will do) are then used to determine an optimal threshold for rebinarizing the gray-level copy (recall that the grayscale copy is originally binarized at a standard threshold.).

The optimal threshold is chosen to obtain the best possible agreement between the numbers of black pixels in the original document image and the rebinarized copy within the matched masks.

The whole grayscale copy, not just the matched blocks, is rebinarized using the optimal threshold to produce a final binary copy. The final binary copy replaces the first binary copy for the rest of the search process.

After rebinarization, the distortion map is recomputed with the matching of the blocks to the final binary copy. The matching scores are updated and select blocks with high enough scores are selected as "good" ones.

Figure 7A:
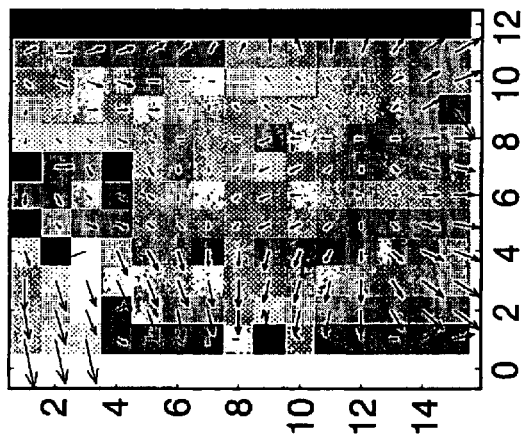
FIG. 7A shows the initial distortion map of a test document after the initial matching.

FIG. 7A shows the initial distortion map of a test document image after the initial matching. Brighter pixels indicate higher matching scores, and black ones indicate empty blocks.

The initial distortion map is improved through iterative relaxation. First, each not yet well matched nonempty block is assigned a matching score that is computed using the average displacement of its good 8-connected neighbors (if any), and the new assignment is kept if it brings a higher matching score. This process is iterated until convergence, and afterwards, 8-neighbor averages are propagated to empty blocks.

Figure 7B:
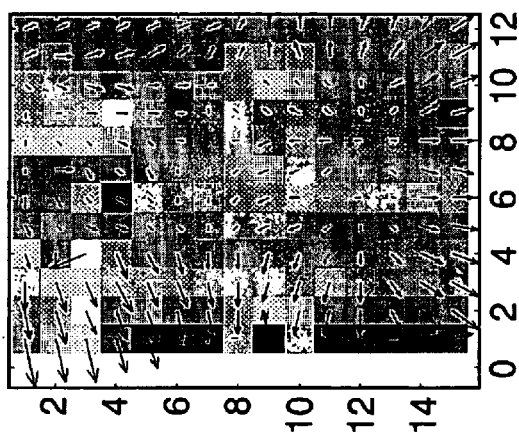
FIG. 7B shows the updated distortion map.

FIG. 7B shows the updated distortion map.

For each block, the variance of its 8 neighbors' displacement vectors is also computed with respect to the block's own displacement vector. For each block with either a low matching score or a high variance, the average displacement of its good neighbors (if any) is taken as the starting position. The search process search for the best match within a 7×7 window, and updates again upon obtaining a higher score. This process is iterated until convergence.

Figure 7C:
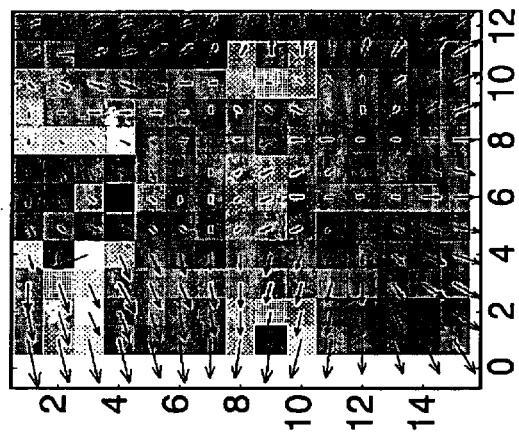
FIG. 7C shows the final distortion map.

FIG. 7C shows the final distortion map.

Using the map of the displacement vectors produced by the document matching module 120 (FIG. 1), the aligned original document image 111 (FIG. 1) can now be registered.

Figure 8:
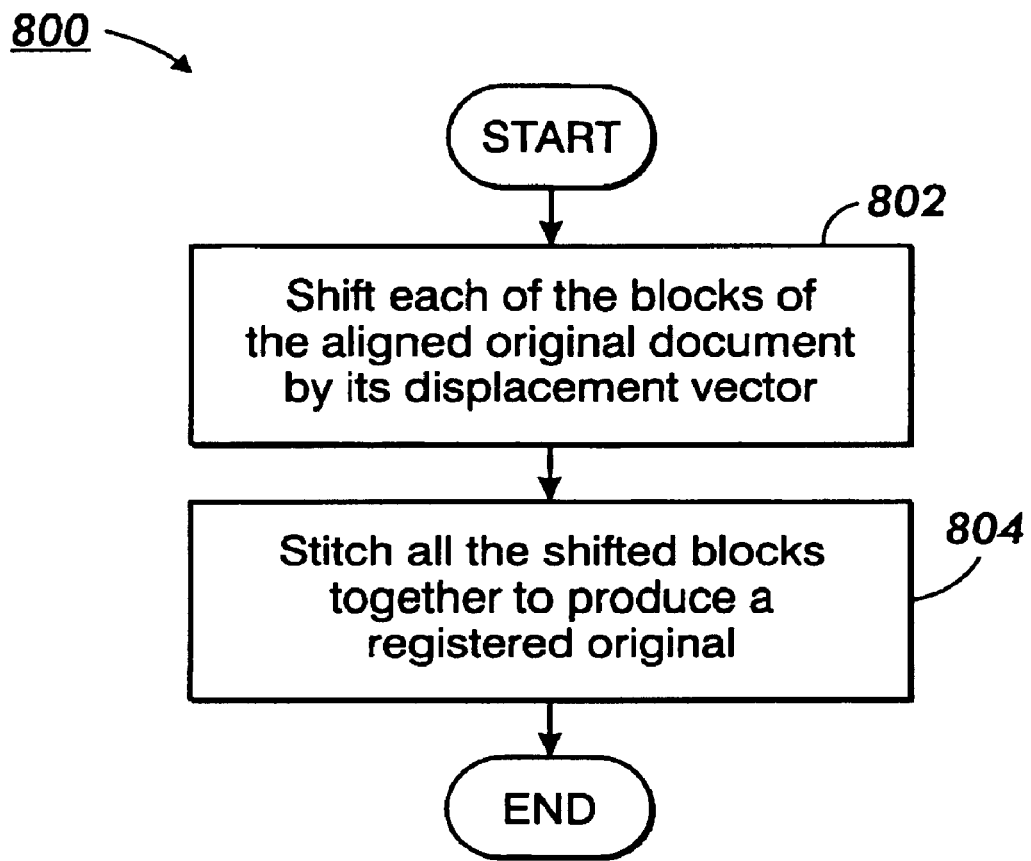
FIG. 8 is a flowchart illustrating an exemplary registration process of the registration module 130 (FIG. 1).

FIG. 8 is a flowchart illustrating an exemplary registration process 800 of the registration module 130 (FIG. 1).

Process 800 shifts each of the image blocks of the aligned original document image by its corresponding displacement vector (block 802). Process 800 stitches all the shifted image blocks together to produce a registered original document image (block 804) then terminates.

Shifting all blocks by their assigned displacements and stitching them together (without interpolation) gives a registered original document image.

The black pixels are dilated in the registered original using a 5×5 structuring element (SE) (that is, each black pixel becomes a 5×5 block), forming a mask Im1 containing the "preprinted data".

Figure 9:
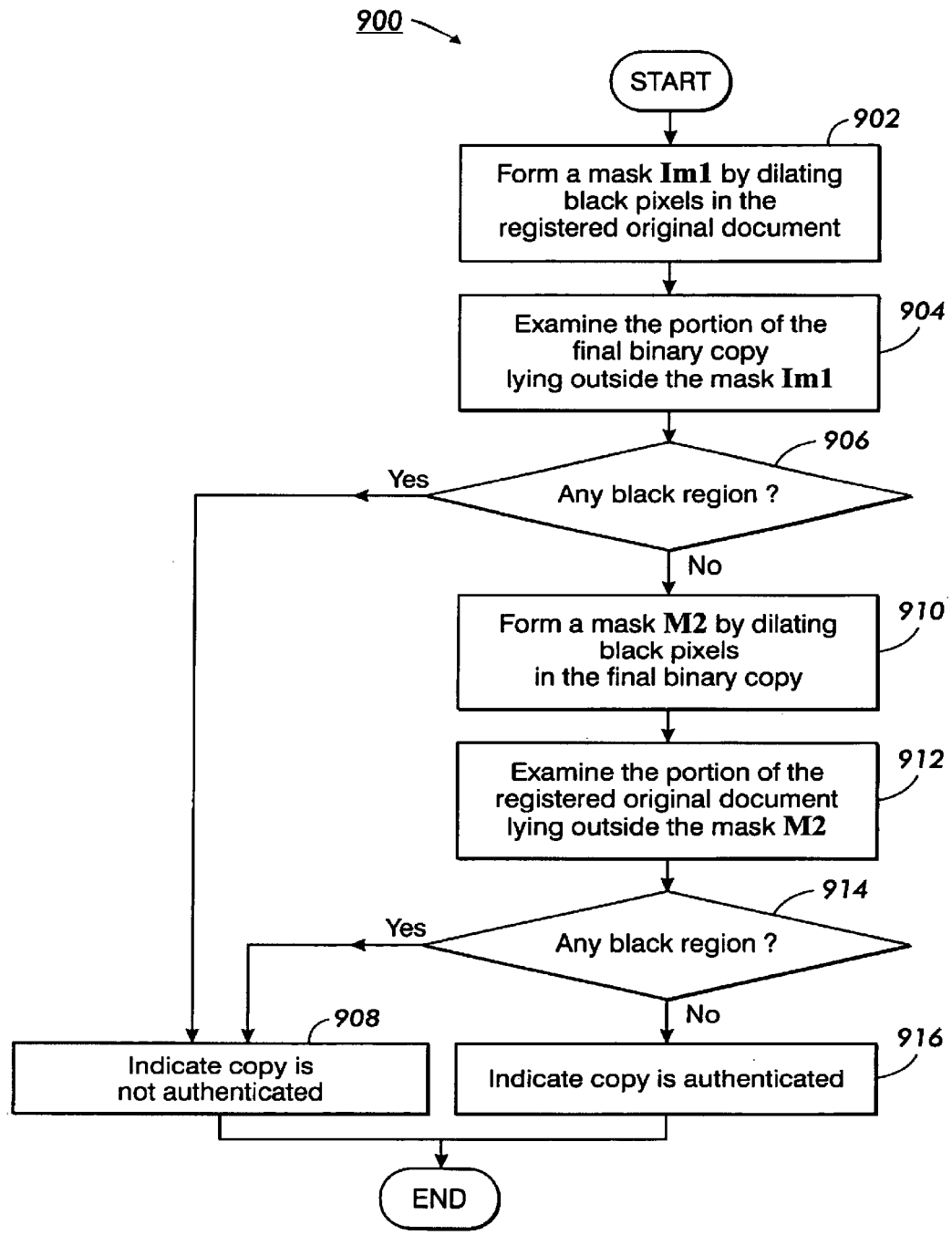
FIG. 9 is a flowchart illustrating an exemplary authentication process of the authentication module 150 (FIG. 1).

FIG. 9 is a flowchart illustrating an exemplary authentication process 900 of the authentication module 150 (FIG. 1).

Process 900 forms a mask Im1 by dilating the black pixels in the registered original (block 902). Process 900 examines the portion of the final binary copy that is lying outside the mask Im1 (block 904). Process 900 checks if there is any significant region of black pixels in this portion (block 906). Any significant region of black pixels in this portion would indicate that the copy contains additional image material that is not present in the original document image. It is noted that isolated black pixels in this portion are acceptable since they may be caused by noise or dust when the gray-level copy was made from a gray-level original document. If there is any significant region of black pixels in this portion, then process 900 outputs an indicator indicating that the gray-level copy is not authenticated (block 908). Process 900 forms a mask M2 by dilating the black pixels in the final binary copy (block 910). Process 900 examines the portion of the registered original document image that is lying outside the mask M2 (block 912). Process 900 checks if there is any significant region of black pixels in this portion (block 914). Any significant region of black pixels in this portion would indicate that the copy contains less image material than the original document image. If there is any significant region of black pixels in this portion, then process 900 outputs an indicator indicating that the gray-level copy is not authenticated (block 908). Otherwise, process 900 indicates that the gray-level copy is authenticated (block 916).

Figure 10:
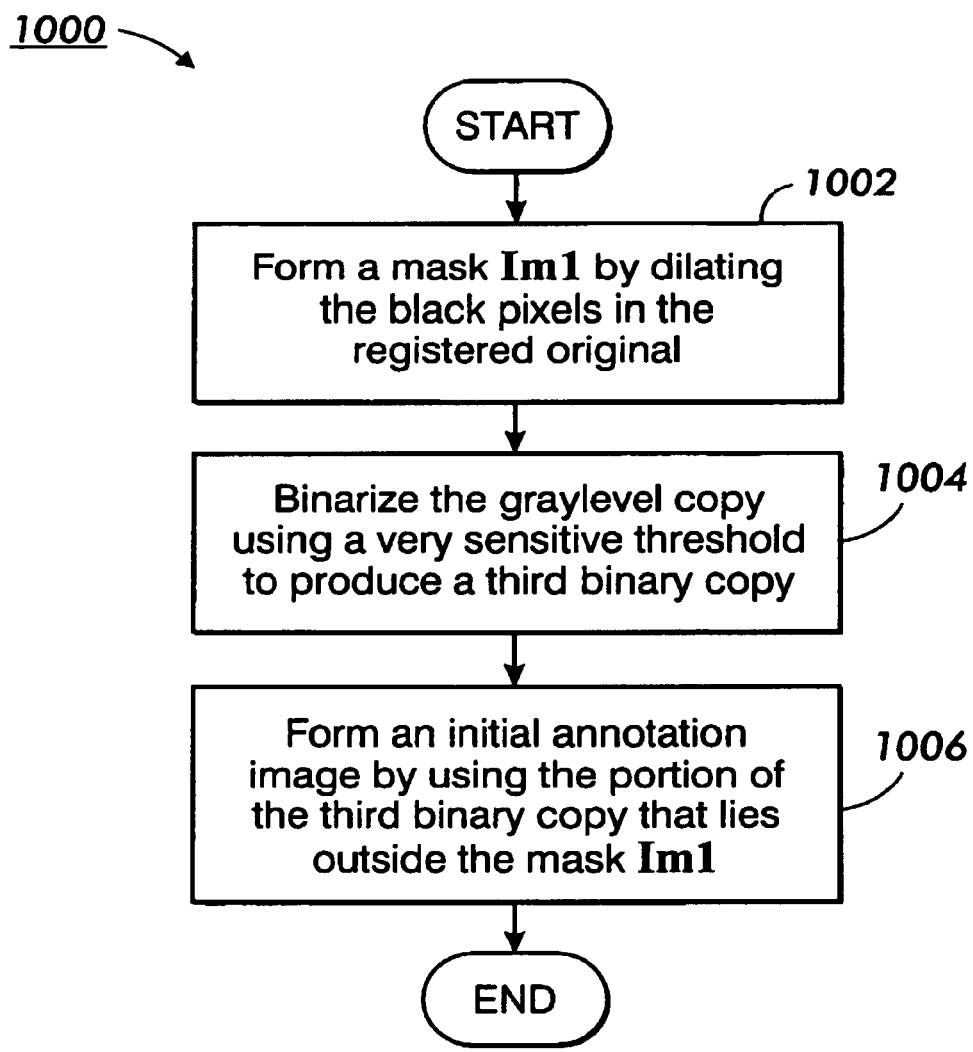
FIG. 10 is a flowchart of an exemplary process 1000 of the initial annotation image module 142 (FIG. 1).

FIG. 10 is a flowchart of an exemplary process 1000 of the initial annotation image module 142 (FIG. 1).

Process 1000 forms a mask Im1 by dilating the black pixels in the registered original (block 1002). Process 1000 binarize the gray-level copy using a very sensitive threshold to produce a third binary copy (block 1004). In one example, the threshold is set at 220 on a range of 0 to 255, with large values representing brighter gray levels. Process 1000 forms an initial annotation image by using the portion of the third binary copy that lies outside the mask Im1 (block 1006).

Figure 11:
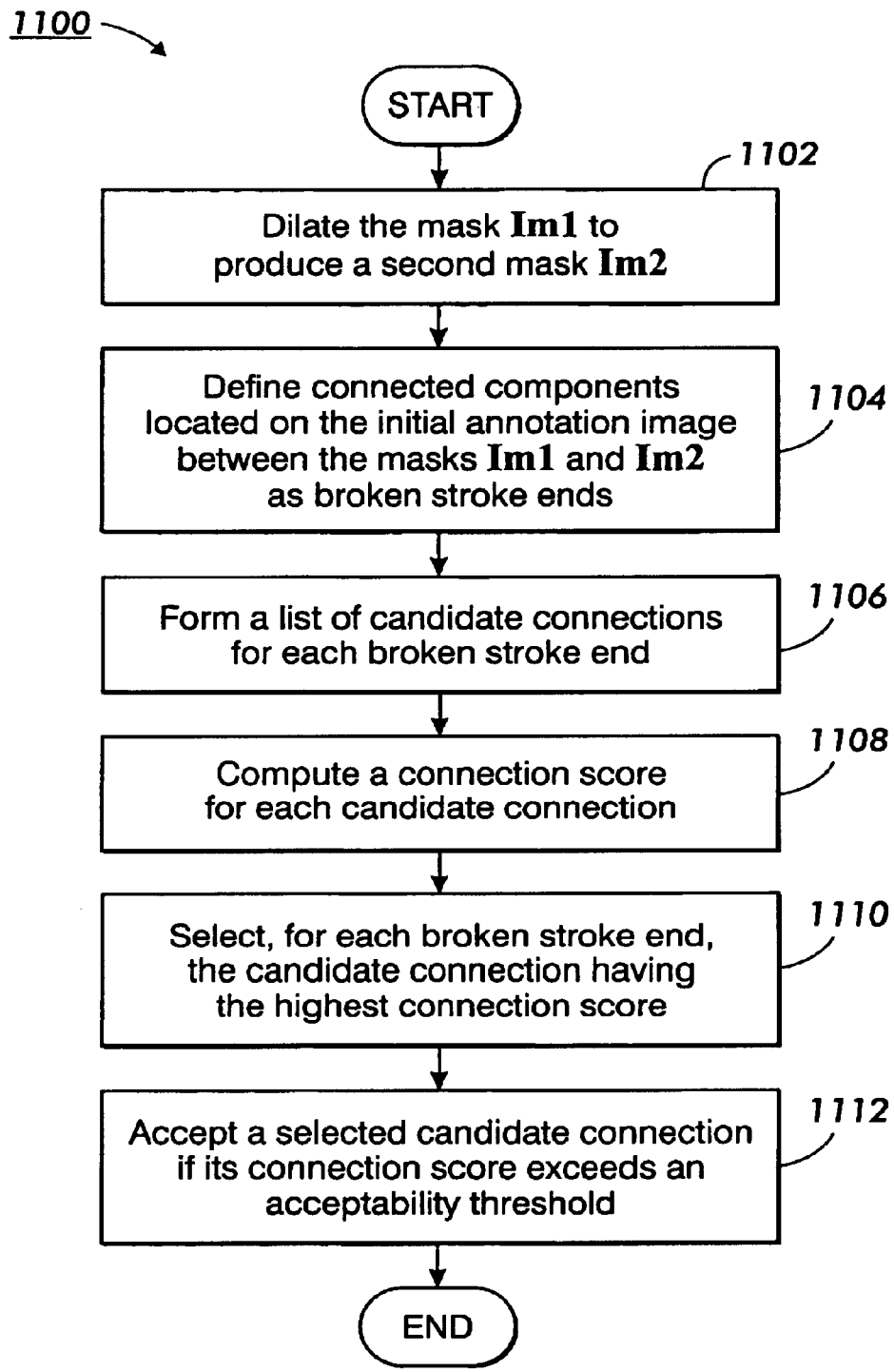
FIG. 11 is a flowchart of the process 1100 of the broken stroke repair module 144 (FIG. 1) as implemented in one embodiment of the present invention.

FIG. 11 is a flowchart of the process 1100 of the broken stroke repair module 144 (FIG. 1) as implemented in one embodiment of the present invention.

Process 1100 dilates the mask Im1 to produce a second mask Im2 (block 1102), and defines each of connected components located on the initial annotation image in the space between the first mask and the second mask as a broken stroke end (block 1104). Process 1100 forms a list of candidate connections for each broken stroke end (block 1106). For each broken stroke end, process 1100 computes a connection score for each of its candidate connections (block 1108). For each broken stroke end, process 1100 selects the candidate connection having the highest connection score (block 1110), and accepts the selected candidate connection if its connection score is above an acceptability threshold (block 1112), then terminates.

Each broken stroke end is usually connected to one other broken stroke end. The exceptional case is when a broken stroke end is itself a connected component in the initial annotation image. It is noted that, in a normal case, a broken stroke end is a part of a connected component in the initial annotation image, but is not itself a connected component. In this case, process 1100 allows this broken stroke end to be connected to more than one other broken stroke end.

A more detailed description of an implementation of blocks 1106 through 1112 is as follows. First, process 1100 selects candidate pairs to attach one broken stroke end to another. For example, each broken stroke end x is paired with one other broken stroke end y, and the pair {x,y} is put on the list of candidate pairs. In the exceptional case mentioned above, x can be paired again with a different broken stroke end.

Process 1100 goes through all the candidate pairs and computes a connection score for each of the candidate pairs. Candidate pairs having the highest connection scores are accepted if these highest connection scores exceed an acceptability threshold.

For a pair {x,y}, process 1100 tests if x has already had some other pair {x,z} accepted, and also tests if y has had some pair {y,w} accepted. If both x and y have already had candidate pairs accepted, then process 1100 does not accept {x,y}, except if the {x,y} pair was put on the list as part of the exceptional case. In this exceptional case, {x,y} pair can be accepted.

In one implementation, for each broken stroke end x, up to 5 candidate connections in a center radius are examined. For the normal case, the candidate connection having the highest score is accepted if the connection score exceeds the acceptability threshold. If the broken stroke end x is an exceptional case, then all candidate connections with sufficiently high scores (i.e., above the acceptability threshold) are accepted.

The following discussion further clarifies the annotation lifting process. Annotations are often lighter than the printed text, especially if they are in color or pencil. For this reason, it is preferable to rebinarize the grayscale copy using a very sensitive threshold to obtain a third binary version of the gray-level copy (block 1004 in FIG. 10), and take what lies outside mask Im1 as the initial annotation image Ia.

Process 1100 improves the appearance of the initial annotation image Ia by repairing the broken strokes, filling in small gaps where annotations crossed over black pixels in the original document image.

Process 1100 searches for broken strokes not only along preprinted lines, but also at gaps caused by arbitrary interference of the preprinted data and annotations.

In one embodiment, process 1100 dilates Im1 with a 3×3 structuring element, yielding Im2.

An 8-connected component falling in the portion between the two masks, i.e., Im2-Im1, is defined to be a broken stroke end. With one exceptional case, each broken end chooses at most one other broken end to connect to.

Figure 12:
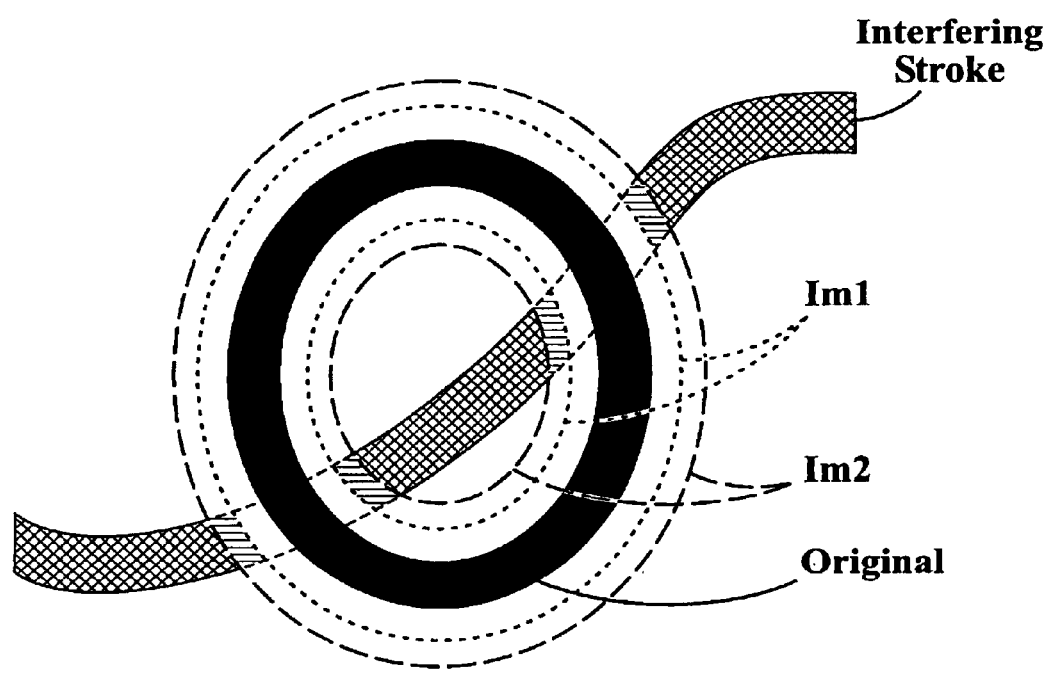
FIG. 12 illustrates how the broken stroke ends are defined.

FIG. 12 illustrates how the broken stroke ends are defined. In FIG. 12, the cross-hatched portion of the interfering stroke that lies between the two masks Im1 and Im2 comprises the broken ends.

Figure 13A:
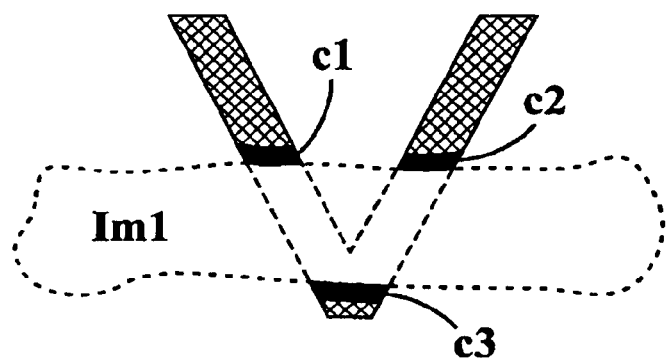
FIG. 13A illustrates the case where a broken end may be chosen by more than one other broken end.

FIG. 13A illustrates the case where a broken end may be chosen by more than one other broken end. In FIG. 13A, the broken end c3 is chosen by both broken ends c1 and c2.

Figure 13B:
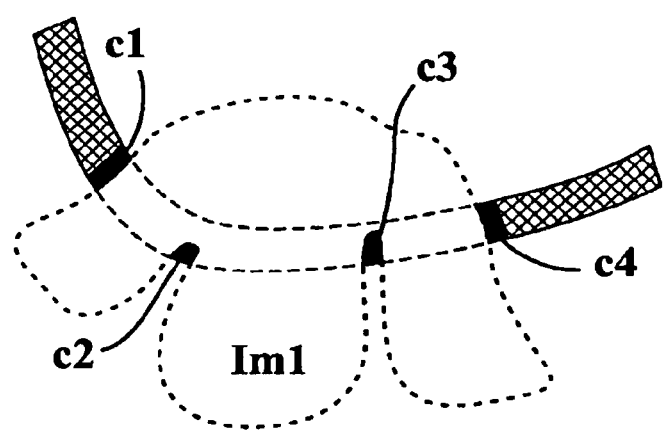
FIG. 13B illustrates the exceptional case where a broken end is itself a connected component in the initial annotation image I$a$.

FIG. 13B illustrates the exceptional case where a broken end is itself a connected component in the initial annotation image Ia. Such a broken end is allowed to be connect to more than one other broken end. In FIG. 13B, broken ends c2 and c3 are such connected components, so each of them is allowed to connect to two other broken ends. Broken end c2 is allowed to connect to c1 and c3. Broken end c3 is allowed to connect to c2 and c4.

Candidate connections are evaluated according to a line tracing protocol, and are accepted in accordance with a criterion that is based on three principles, which are proximity, consistency and smoothness.

Figure 14A:
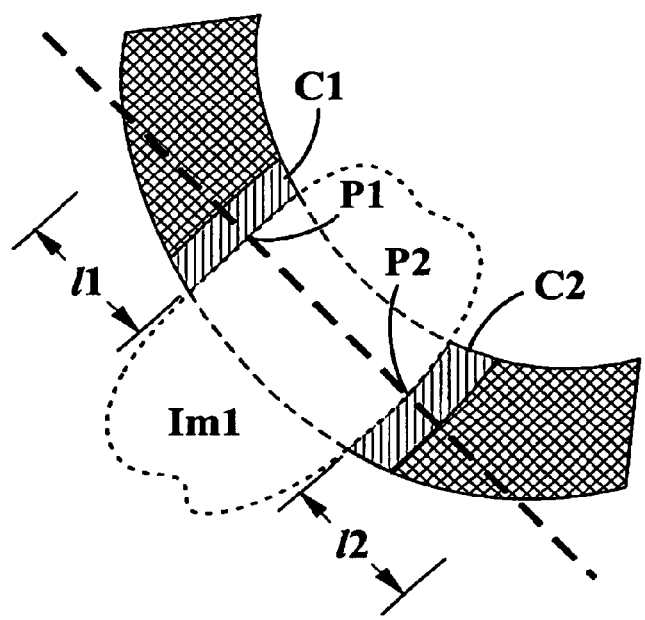
FIG. 14A illustrates the line tracing protocol.

FIG. 14A illustrates the line tracing protocol. To test whether ends c1 and c2 came from the same stroke, a line is drawn through their centroids C1 and C2. If c1 and c2 came from the same annotation stroke, then consistency principle requires that black pixels be present along segment P1P2 in the third binary copy and white pixels be present along the segment P1P2 in the initial annotation image Ia. The consistency measure c is set to 1 if this is satisfied, and 0 otherwise.

The smoothness principle requires stroke continuity beyond the points P1 and P2. The lengths of black pixel runs $l1$ and $l2$ in each direction are computed. The smoothness measure s is defined to be $s=\max\{l1, l2\}$.

The proximity measure p is defined to be distance between P1 and P2, i.e., $p=|P1\ P2|$. Candidate connections having small proximity measure are favored.

The connection score is defined as cs/p and is computed for each candidate connection. Of all possible connections for a given broken end, process 1100 examines the one with the highest connection score, and accepts it if its connection score is sufficiently high. As a practical speed-up, for each broken end, only the five nearest ends within a certain radius are considered. Thus, the complexity of the line tracing protocol is reduced to linear in the number of broken ends.

Figure 14B:
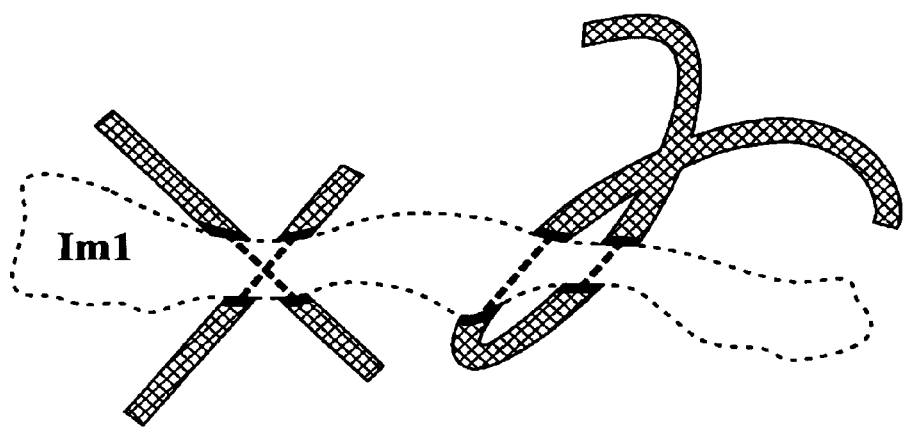
FIG. 14B illustrates two broken end cases that are difficult to resolve.

FIG. 14B illustrates two broken end cases that are difficult to resolve. The line tracing protocol can robustly resolve such difficult cases.

After the candidate connections are accepted, pixels are blackened along accepted connections by dilating the line segment between the two broken stroke ends. The smaller of the two broken stroke ends can be used as the structuring element for this dilation.

A system of the present invention has been used to test on a large variety of documents. Annotated copies were generated by multigeneration copying, faxing, and so forth. Different scanners were used for digitizing the original and the annotated copy.

Figure 15A:
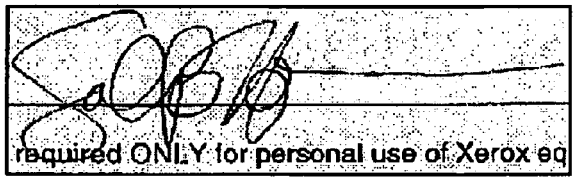
FIG. 15A shows the grayscale image of an annotated copy.
Figure 15B:
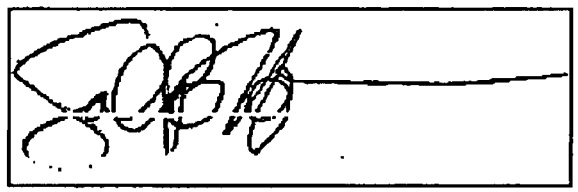
FIG. 15B shows the initial annotation image.
Figure 15C:
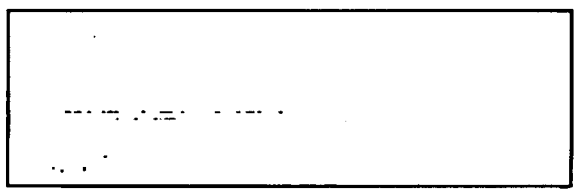
FIG. 15C shows the broken stroke ends.
Figure 15D:
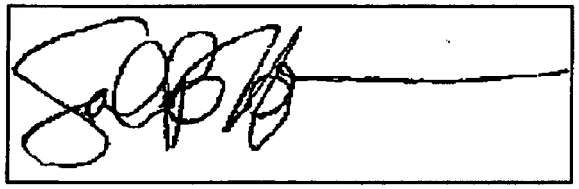
FIG. 15D shows the final annotation image after broken stroke end reconstruction.

FIGS. 15A, 15B, 15C and 15D illustrate one test example. FIG. 15A shows the grayscale image of an annotated copy. FIG. 15B shows the initial annotation image. FIG. 15C shows the broken stroke ends. FIG. 15D shows the final annotation image after broken stroke end reconstruction.

Various modifications can be made to the embodiment of the present invention as described above. For example, the global alignment process 200 (FIG. 2) works well on document images having small amount of skew and scale variations. To handle larger skew, the global alignment module 110 (FIG. 1) may need to use a preliminary de-skewing process. As another example of modifications, broken stroke repair module 144 (FIG. 1) can use a more sophisticated algorithm than process 1100 for determining stroke width. Smoother gap filling can be achieved using elastic structuring elements.

While certain exemplary embodiments have been described in detail and shown in the accompanying drawings, it is to be understood that such embodiments are merely illustrative of and not restrictive on the broad invention. It will thus be recognized that various modifications, such as those mentioned above, may be made to the illustrated and other embodiments of the invention described above, without departing from the broad inventive scope thereof. It will be understood, therefore, that the invention is not limited to the particular embodiments or arrangements disclosed, but is rather intended to cover any changes, adaptations or modifications which are within the scope and spirit of the invention as defined by the appended claims.

What is claimed is:

1. A method for matching an original document image with a copy image, the method comprising the operations of:
   (a) defining the original document image as an ensemble of blocks, each of the blocks having neighboring blocks;
   (b) forming a mask for each of the blocks by dilating foreground pixels included in the block;
   (c) searching for a best match in the copy image, for each of the blocks, using a first search window, by correlating pixels in the mask with pixels in a corresponding portion in the copy image, each of the best matches having a matching score;
   (d) indicating each of the blocks as "unmatched" when the corresponding matching score is less than a matching threshold; and
   (e) computing a displacement vector for each of the matched blocks.

2. The method of claim 1 further comprising the operation of:
   (f) binarizing a gray-level copy using a first binarization threshold to produce the copy image.

3. The method of claim 2 further comprising the operations of:
   (g) computing a second binarization threshold based on the matched blocks;
   (h) binarizing the gray-level copy using the second binarization threshold to produce a second binary copy;
   (i) assigning to each of the unmatched blocks a displacement vector based on an average of respective displacement vectors of the neighboring blocks of said unmatched block;
   (j) searching for a new best match in the second binary copy, for each of the blocks, using a second search window, by correlating pixels in the mask with pixels in a corresponding portion in the second binary copy, each of the new best matches having a new matching score;
   (k) indicating each of the blocks as "unmatched" when the corresponding new matching score is less than a matching threshold; and
   (l) computing a new displacement vector for each of the new matched blocks.

4. The method of claim 3 further comprising the operation of:
   (m) repeating operations (i) through (l) until all the blocks are matched.

5. The method of claim 3 wherein the second search window is smaller than the first search window.

6. The method of claim 1 wherein the blocks are overlapping.

7. The method of claim 1 wherein operation (c) is performed via a hierarchical search procedure.

8. The method of claim 1 further comprising the operations of:

shifting each of the blocks by the respective displacement vector;

stitching the shifted blocks together to produce a registered original.

9. The method of claim 1 wherein the original document image and the copy image are in gray-level form.

10. The method of claim 1 wherein the original document image and the copy image are in binary form.

11. The method of claim 1 wherein the original document image is in binary form and the copy image is in gray-level form.

12. The method of claim 1 wherein the method is delineated by computer instructions, the computer instructions carried by a computer-usable data earner, the computer instructions, when executed by a computer, capable of causing the computer to perform the method.

13. The method of claim 12 wherein the computer-usable data carrier is a network or a tangible data storage device.

14. A method for producing an annotation image from a copy image and a registered original document image, the method comprising the operations of:

(a) forming a first mask by dilating foreground pixels in the registered original document image;

(b) forming a first annotation image by using portion of the copy image that lies outside the first mask;

(c) forming a second mask by dilating the first mask;

(d) defining each of connected components located on the first annotation image in the space between the first mask and the second mask as a broken stroke end; and (e) connecting each of the broken stroke ends to at least one other broken stroke end, the other broken stroke end being chosen in accordance with a line tracing protocol.

15. The method of claim 14 wherein operation (e) comprises the operation of allowing a broken stroke end to be connected to more than one other broken stroke end when said broken stroke end is itself a connected component in the first annotation image.

16. The method of claim 14 wherein operation (e) comprises the operations of:

(1) forming a of candidate connections for a broken stroke end;

(2) computing a connection score for each of the candidate connections; and (3) selecting the candidate connection having the highest connection score.

17. The method of claim 16 wherein, in operation (2), the connection score is based on consistency, smoothness and proximity measures.

18. The method of claim 16 wherein, in operation (2), the connection score is computed as cs/p where c represents the consistency measure, s represents the smoothness measure and p represents the proximity measure.

19. The method of claim 14 wherein the method is delineated by computer instruction, the computer instructions carried by a computer-usable data carrier, the computer instructions, when executed by a computer, capable of causing the computer to perform the method.

20. The method of claim 19 wherein, the computer-usable data carrier is a network or a tangible data storage device.

21. A system for matching an original document image with a copy image, the system comprising:

(a) a partition module for defining the original document image as an ensemble of blocks, each of the blocks including foreground pixels;

(b) a mask forming module for forming a mask for each of the blocks by dilating the foreground pixels included in the block;

(c) a search module for searching for a best match in the copy image, for each of the blocks, by correlating pixels in the mask with pixels in a corresponding portion in the copy image, the search module assigning to each of the best matches a matching score, and indicating each of the blocks as "unmatched" when the corresponding matching score is less than a matching threshold; and (d) a displacement computing module for computing a displacement vector for each of the matched blocks.

22. The system of claim 21 wherein the partition module defines the blocks such that the blocks are overlapping.

23. The system of claim 21 wherein the search module uses a hierarchical search procedure.

24. The system of claim 21 further comprising:

a registration module shifting each of the blocks by the respective displacement vector and stitching the shifted blocks together to produce a registered original.

25. A system for producing an annotation image from a copy image and a registered original document image, the system comprising:

(a) an initial annotation image module, the initial annotation image module forming a first mask by dilating foreground pixels in the registered original document image, forming a first annotation image by using portion of the copy image that lies outside the first mask, forming a second mask by dilating the first mask, and defining each of connected components located on the first annotation image in the space between the first mask and the second mask as a broken stroke end; and (b) a broken stroke repair module connecting each of the broken stroke ends to at least one other broken stroke end, the other broken stroke end being chosen in accordance with a line tracing protocol.

26. The system of claim 25 wherein the broken stroke repair module allows a broken stroke end to be connected to more than one other broken stroke end when said broken stroke end is itself a connected component in the first annotation image.

27. The system of claim 25 wherein the broken stroke repair module comprises:

(1) a connection module for forming a list of candidate connections for a broken stroke end;

(2) a score computing module for computing a connection score for each of the candidate connections; and (3) a selecting module for selecting the candidate connection having the highest connection score.

* * * * *